United States Patent
Urakabe et al.

(10) Patent No.: US 8,773,082 B2
(45) Date of Patent: Jul. 8, 2014

(54) DC/DC POWER CONVERSION APPARATUS

(75) Inventors: Takahiro Urakabe, Tokyo (JP); Tatsuya Okuda, Tokyo (JP); Yuuya Tanaka, Tokyo (JP); Masaru Kobayashi, Tokyo (JP); Matahiko Ikeda, Tokyo (JP); Hirotoshi Maekawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 375 days.

(21) Appl. No.: 13/382,231

(22) PCT Filed: Jul. 26, 2010

(86) PCT No.: PCT/JP2010/004746
§ 371 (c)(1),
(2), (4) Date: Jan. 4, 2012

(87) PCT Pub. No.: WO2011/016199
PCT Pub. Date: Feb. 10, 2011

(65) Prior Publication Data
US 2012/0126764 A1 May 24, 2012

(30) Foreign Application Priority Data
Aug. 5, 2009 (JP) ................................ 2009-182127

(51) Int. Cl.
*H02M 3/158* (2006.01)
(52) U.S. Cl.
USPC .......................................... 323/225; 323/271
(58) Field of Classification Search
CPC ......................... H02M 3/158; H02M 2003/158
USPC .................. 323/222, 223, 225, 271, 282, 351
See application file for complete search history.

(56) References Cited

U.S. PATENT DOCUMENTS 7,327,127 B2 * 2/2008 Ho .................................. 323/271
7,619,907 B2 11/2009 Urakabe et al.
(Continued)

FOREIGN PATENT DOCUMENTS

DE 10 2004 040 022 A1 2/2006
JP 61 92162 5/1986
(Continued)

OTHER PUBLICATIONS

Combined Office Action and Search Report issued Dec. 19, 2013 in Chinese Patent Application No. 201080034386.8 (with partial English Translation).

(Continued)

*Primary Examiner* — Gary L Laxton
(74) *Attorney, Agent, or Firm* — Oblon, Spivak, McClelland, Maier & Neustadt, L.L.P.

(57) ABSTRACT

An object of the present invention is to provide a DC/DC power conversion apparatus that can reduce the average power consumption over a wide range of DC voltage ratios. A control circuit (120) changes a switching frequency f at which IGBTs S1 to S4 perform ON/OFF operation, in accordance with a voltage ratio k (k=V2/V1) for DC voltage conversion, based on the following expressions, such that a magnitude ΔI of a current ripple flowing in a reactor Lc is a predetermined constant value irrespective of the voltage ratio k.

If $1 \leq k < 2$:

$$f = (V1/(2 \times L \times \Delta I)) \times (k-1) \times (2-k)/k$$

If $k > 2$:

$$f = (V1/(2 \times L \times \Delta I)) \times (k-2)/k$$

15 Claims, 9 Drawing Sheets

(56) References Cited

U.S. PATENT DOCUMENTS

| | | | |
|---|---|---|---|
| 7,729,144 | B2 | 6/2010 | Urakabe et al. |
| 7,948,221 | B2 * | 5/2011 | Watanabe et al. ............. 323/271 |
| 8,036,008 | B2 | 10/2011 | Ikeda et al. |
| 8,040,702 | B2 | 10/2011 | Urakabe et al. |
| 8,212,537 | B2 * | 7/2012 | Carpenter et al. ............ 323/225 |
| 2005/0174098 | A1 | 8/2005 | Watanabe et al. |
| 2007/0019442 | A1 | 1/2007 | Li et al. |
| 2007/0296383 | A1 | 12/2007 | Xu et al. |
| 2009/0140706 | A1 | 6/2009 | Taufik et al. |
| 2013/0002215 | A1 * | 1/2013 | Ikeda et al. .................. 323/271 |

FOREIGN PATENT DOCUMENTS

| | | |
|---|---|---|
| JP | 6-67181 B2 | 8/1994 |
| JP | 2005 224060 | 8/2005 |
| JP | 2008 295228 | 12/2008 |

OTHER PUBLICATIONS

Office Action issued Nov. 7, 2013 in German Patent Application No. 11 2010 003 189.4 (with English language translation).
International Search Report Issued Oct. 12, 2010 in pCT/JP10/04746 Filed Jul. 26, 2010.

* cited by examiner

DC/DC POWER CONVERSION APPARATUS

TECHNICAL FIELD

The present invention relates to a DC/DC power conversion apparatus that converts a DC voltage into a stepped-up or stepped-down DC voltage.

BACKGROUND ART

Conventional DC/DC power conversion apparatuses control the amount of energy to be stored or released in a reactor by using ON/OFF operation of a switching device, thereby performing DC/DC voltage conversion. Since there is a problem that the reactor is large and heavy, there are proposed techniques in which a voltage applied to the reactor is reduced by using charge and discharge of a capacitor and an inductance value needed for the reactor is reduced, whereby the size and the weight of the reactor is decreased (see, for example, Patent Literature 1 and Patent Literature 2).

CITATION LIST

Patent Literature

Patent Literature 1: Japanese Laid-Open Patent Publication No. 61-92162
Patent Literature 2: Japanese Laid-Open Patent Publication No. 2005-224060

SUMMARY OF THE INVENTION

Problems to be Solved by the Invention

In such conventional DC/DC power conversion apparatuses, operation to store or release energy in a reactor is controlled by causing a switching device to perform ON/OFF operation at a certain switching frequency, whereby a voltage is stepped up or stepped down to a predetermined level, and the resultant voltage is supplied to a load.

Then, owing to the ON/OFF operation of the switching device, switching loss occurs in the switching device. The switching loss increases as a switching frequency increases. In addition, if the switching frequency is decreased in order to suppress the switching loss, a current ripple of the reactor increases. Owing to the magnitude of the variation in current and voltage, radiation noise and conduction noise increase. As a result, a problem such as erroneous operation of peripheral apparatuses or equipment occurs, and a trouble in which loss in the reactor or lines increases because the effective value of the current increases.

Here, a DC/DC power conversion apparatus can be configured as a system, in combination with an inverter which converts DC power into AC power. For example, a power conversion system for photovoltaic power generation, an air conditioner, and an electric driving system of a hybrid vehicle are known. A DC/DC power conversion apparatus used in such a system controls the output voltage, i.e., controls the voltage ratio for the voltage conversion, in accordance with the state of a power supply (for example, the irradiation amount of light to a photo voltaic battery of a photovoltaic power generation system) or the state of a load (for example, the rotation speed of a motor of an electric driving system of a hybrid vehicle).

The adjustment of the voltage ratio is performed by controlling the conduction ratio of a switching device, i.e., a so-called duty factor. Therefore, along with this, the magnitude of the current ripple of a reactor also varies.

Therefore, the conventional DC/DC power conversion apparatuses set the switching frequency of the switching device, taking into consideration the variation in the current ripple of the reactor caused by the variation in the voltage ratio. However, the setting is not easy because there is an incompatible relationship between the switching loss and the troubles due to the reactor current as described above.

Therefore, there is a problem that the conventional DC/DC power conversion apparatuses cannot sufficiently meet the recent high-level demand of saving energy that average power consumption should be reduced over a wide operation range.

The present invention has been made to solve the above problems, and an object of the present invention is to provide a DC/DC power conversion apparatus that enables reduction of average power consumption over a wide range of DC voltage ratios.

Solution to the Problems

A DC/DC power conversion apparatus according to the present invention comprises: high voltage terminals; low voltage terminals; a device series unit including a plurality of rectification devices connected in series to each other, the device series unit being connected between the high voltage terminals; switching devices connected in parallel to all or some of the plurality of rectification devices, respectively; at least one capacitor for retaining a divided voltage of a voltage between the high voltage terminals, the at least one capacitor being connected in parallel to the plurality of the rectification devices; a reactor for, in accordance with switching operation of the switching devices, allowing conduction and performing operation to store or release energy, one end of the reactor being connected to one of the low voltage terminals, and the other end being connected to a series connection point among the plurality of rectification devices; and a control circuit for, by controlling ON/OFF operation of the switching devices, controlling DC voltage conversion between the voltage between the high voltage terminals and a voltage between the low voltage terminals, wherein the control circuit changes, in accordance with a voltage ratio of the DC voltage conversion, a switching frequency at which the switching devices perform ON/OFF operation, such that the magnitude of a current ripple flowing in the reactor is equal to or smaller than a predetermined limiting value irrespective of the voltage ratio.

Effect of the Invention

As described above, the control circuit of the DC/DC power conversion apparatus according to the present invention, in accordance with a voltage ratio of the DC voltage conversion, changes a switching frequency at which the switching devices perform ON/OFF operation, such that the magnitude of a current ripple flowing in the reactor is equal to or smaller than a predetermined limiting value irrespective of the voltage ratio. Therefore, the current ripple of the reactor is suppressed to be equal to or smaller than the limiting value, and thus, the loss and troubles due to the current ripple are suppressed to be equal to or smaller than a certain level, while the average value of the switching frequency is reduced over a wide range of voltage ratios. In this way, the average power consumption can be reduced in comparison with the conventional techniques in which the switching frequency is constant irrespective of the voltage ratio.

MODE FOR CARRYING OUT THE INVENTION

Embodiment 1

Hereinafter, a DC/DC power conversion apparatus according to embodiment 1 of the present invention will be described.

Figure 1:
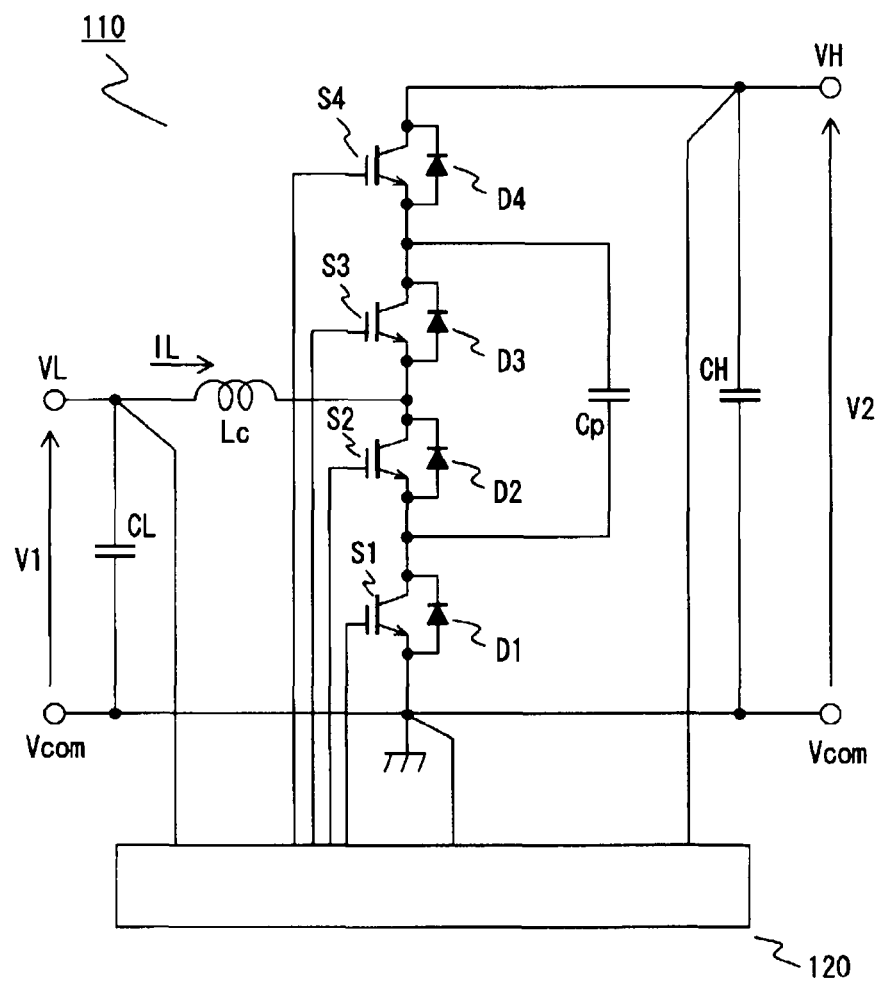
FIG. 1 shows the circuit configuration of a DC/DC power conversion apparatus according to embodiment 1 of the present invention.

FIG. 1 shows the circuit configuration of the DC/DC power conversion apparatus according to embodiment 1 of the present invention. As shown in FIG. 1, the DC/DC power conversion apparatus has a DC/DC power conversion function of converting a voltage V1 inputted between low voltage terminals VL and Vcom into a voltage V2 which has been stepped up and is equal to or larger than the voltage V1, and outputting the voltage V2 between high voltage terminals VH and Vcom (step-up operation). In addition, the DC/DC power conversion apparatus has a DC/DC power conversion function of converting a voltage V2 inputted between the high voltage terminals VH and Vcom into a voltage V1 which has been stepped down and is equal to or smaller than the voltage V2, and outputs the voltage V1 between the low voltage terminals VL and Vcom (step-down operation).

The DC/DC power conversion apparatus includes a main circuit 110 and a control circuit 120. The main circuit 110 includes: smoothing capacitors CL and CH for smoothing the input voltage V1 and the output voltage V2; four IGBTs (Insulated Gate Bipolar Transistors) S1 to S4 (hereinafter, abbreviated as S1 etc. as appropriate) as switching devices; four first to fourth rectification devices D1 to D4 (hereinafter, abbreviated as D1 etc. as appropriate) connected in parallel to the respective IGBTs so as to have conduction directions opposite to those of the IGBTs; a reactor Lc connected between the low voltage terminal VL and a switching device group including the IGBTs and the rectification devices; and a capacitor Cp connected among the switching device group.

Next, the details of the connection of the circuit will be described. Both the terminals of the smoothing capacitor CL are connected to the low voltage terminals VL and Vcom, respectively, and the low voltage terminal Vcom is grounded. The low-voltage-side terminal of the smoothing capacitor CH is connected to the high voltage terminal Vcom, and the high-voltage-side terminal of the smoothing capacitor CH is connected to the high voltage terminal VH.

The emitter terminal of S1 is connected to the low voltage terminal Vcom, and the collector terminal of S1 is connected to the emitter terminal of S2. The collector terminal of S2 is connected to the emitter terminal of S3. The collector terminal of S3 is connected to the emitter terminal of S4, and the collector terminal of S4 is connected to the high voltage terminal VH. The anode terminal of D1 is connected to the emitter terminal of S1, and the cathode terminal of D1 is connected to the collector terminal of S1. The anode terminal of D2 is connected to the emitter terminal of S2, and the cathode terminal of D2 is connected to the collector terminal of S2. The anode terminal of D3 is connected to the emitter terminal of S3, and the cathode terminal of D3 is connected to the collector terminal of S3. The anode terminal of D4 is connected to the emitter terminal of S4, and the cathode terminal of D4 is connected to the collector terminal of S4.

The reactor Lc is connected between the low voltage terminal VL and the series connection point between a parallel unit of S2 and D2 and a parallel unit of S3 and D3. The capacitor Cp is connected in parallel to a series unit in which the parallel unit of S2 and D2 and the parallel unit of S3 and D3 are connected in series to each other.

The gate terminals of S1, S2, S3, and S4, and the voltage terminals VH, VL, and Vcom are connected to the control circuit 120. Gate signals are inputted to the respective gate terminals of S1, S2, S3, and S4, based on the respective voltages of the emitter terminals of the IGBTs as references.

Next, operations will be described. First, the step-up operation will be described. The operation of the DC/DC power conversion apparatus differs between when the relationship between the input voltage and the output voltage indicates that V2 is equal to or larger than 1×V1 and is smaller than 2×V1, and when the relationship indicates that V2 is larger than 2×V1. First, the operation of stepping up the voltage V1 to the voltage V2 having a value in a range 1×V1≤V2<2×V1, and outputting the voltage V2 between the high voltage terminals VH and Vcom, will be described.

In this case, a DC power supply having the voltage V1 (the smoothing capacitor CL is assumed to have a large capacity and the power supply may be regarded as a DC power supply in the operation during a predetermined time period) is connected between the low voltage terminals VL and Vcom, a DC load is connected between the high voltage terminals VH and Vcom, and energy is consumed through a route from VL-Vcom to VH-Vcom.

Figure 2:
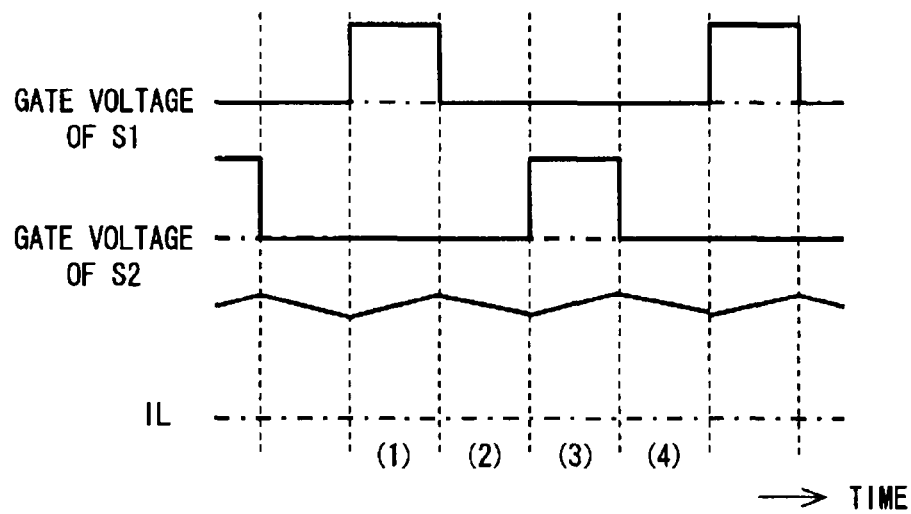
FIG. 2 shows the waveforms of the gate voltages and the waveform of a current IL of a reactor Lc in step-up operation according to embodiment 1 of the present invention in the case where a voltage is adjusted to a value in a range $1 \times V1 \leq V2 < 2 \times V1$.

FIG. 2 shows the voltage waveforms of the gate signals for the IGBTs S1 and S2, and the waveform of a current IL of the reactor Lc. It is noted that each IGBT turns on when the gate signal has a high voltage. In the stationary state, a voltage of 0.5×V2 is stored in the capacitor Cp. In the step-up operation, S3 and S4 are OFF, and S1 and S2 perform ON/OFF operation. The operation includes the following four modes.

When the gate voltage of S1 is high and the gate voltage of S2 is low (in a time interval (1) in FIG. 2), since S1 is ON and S2 is OFF, energy transfers to the reactor Lc and the capacitor Cp through the following route.

CL→Lc→D3→Cp→S1→CL

That is, operation to store the energy by the reactor Lc is performed through conduction to the reactor Lc, the reactor Lc being connected to the smoothing capacitor CL, i.e., between the low voltage terminals VL and Vcom, via the capacitor Cp.

When the gate voltage of S1 is low and the gate voltage of S2 is low (in a time interval (2) in FIG. 2), since S1 is OFF and S2 is OFF, energy stored in the reactor Lc transfers to the capacitor CH through the following route.

CL→Lc→D3→D4→CH→CL

When the gate voltage of S1 is low and the gate voltage of S2 is high (in a time interval (3) in FIG. 2), since S1 is OFF and S2 is ON, energy stored in the capacitor Cp transfers to the capacitor CH and energy is stored in the reactor Lc through the following route.

CL→Lc→S2→Cp→D4→CH→CL

That is, also here, operation to store the energy by the reactor Lc is performed through conduction to the reactor Lc, the reactor Lc being connected, via the capacitor Cp, between the low voltage terminals VL and Vcom.

When the gate voltage of S1 is low and the gate voltage of S2 is low (in a time interval (4) in FIG. 2), since S1 is OFF and S2 is OFF, energy stored in the reactor Lc transfers to the capacitor CH through the following route.

CL→Lc→D3→D4→CH→CL

The series of operations described above is repeated, whereby the voltage V1 that has been inputted is adjusted so as to be stepped up to the voltage V2 having a value in the range 1×V1≤V2<2×V1, and the voltage V2 is outputted.

It is noted that in the above range, the case where V1 is equal to V2 corresponds to the case where both S1 and S2 are maintained in OFF-state.

Next, the operation of stepping up the voltage V1 to the voltage V2 having a value in a range V2>2×V1, and outputting the voltage V2 between the high voltage terminals VH and Vcom, will be described. Also in this case, a DC load is connected between the high voltage terminals VH and Vcom, and energy is consumed through the route from VL-Vcom to VH-Vcom.

Figure 3:
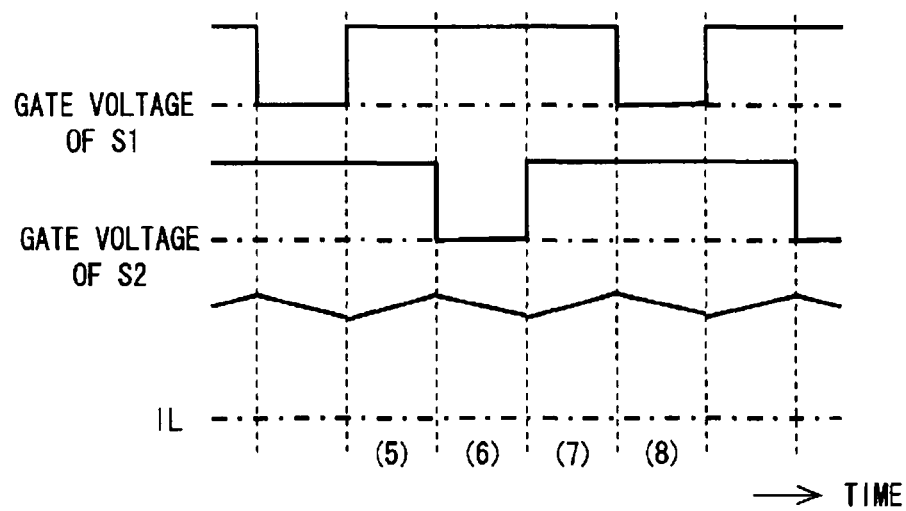
FIG. 3 shows the waveforms of the gate voltages and the waveform of the current IL of the reactor Lc in the step-up operation according to embodiment 1 of the present invention in the case where a voltage is adjusted to a value in a range $2 \times V1 < V2$.

FIG. 3 shows the voltage waveforms of the gate signals for the IGBTs S1 and S2, and the waveform of the current IL of the reactor Lc. Also in this case, in the stationary state, a voltage of 0.5×V2 is stored in the capacitor Cp. Similarly, in the step-up operation, S3 and S4 are OFF, and S1 and S2 perform ON/OFF operation. The operation includes the following four modes.

When the gate voltage of S1 is high and the gate voltage of S2 is high (in a time interval (5) in FIG. 3), since S1 is ON and S2 is ON, energy transfers to the reactor Lc through the following route.

CL→Lc→S2→S1→CL

That is, operation to store the energy by the reactor Lc is performed through conduction to the reactor Lc, the reactor Lc being directly connected between the low voltage terminals VL and Vcom not via the capacitor Cp.

When the gate voltage of S1 is high and the gate voltage of S2 is low (in a time interval (6) in FIG. 3), since S1 is ON and S2 is OFF, energy stored in the reactor Lc transfers to the capacitor Cp through the following route.

CL→Lc→D3→Cp→S1→CL

When the gate voltage of S1 is high and the gate voltage of S2 is high (in a time interval (7) in FIG. 3), since S1 is ON and S2 is ON, energy transfers to the reactor Lc through the following route.

CL→Lc→S2→S1→CL

That is, also here, operation to store the energy by the reactor Lc is performed through conduction to the reactor Lc, the reactor Lc being directly connected between the low voltage terminals VL and Vcom not via the capacitor Cp.

When the gate voltage of S1 is low and the gate voltage of S2 is high (in a time interval (8) in FIG. 3), since S1 is OFF and S2 is ON, energy stored in the reactor Lc and energy stored in the capacitor Cp transfer to the capacitor CH through the following route.

CL→Lc→S2→Cp→D4→CH→CL

The series of operations described above is repeated, whereby the voltage V1 that has been inputted is adjusted so as to be stepped up to the voltage V2 having a value in the range V2>2×V1, and the voltage V2 is outputted.

Next, the step-down operation will be described. Also the step-down operation differs between when the relationship between the input voltage and the output voltage indicates that V2 is equal to or larger than 1×V1 and is smaller than 2×V1, and when the relationship indicates that V2 is larger than 2×V1. First, the operation of stepping down the voltage V2 to the voltage V1 having a value in a range 1×V2≥V1>0.5×V2, and outputting the voltage V1 between the low voltage terminals VL and Vcom, will be described.

In this case, a DC power supply having the voltage V2 (the smoothing capacitor CH is assumed to have a large capacity and the power supply may be regarded as a DC power supply in the operation during a predetermined time period) is connected between the high voltage terminals VH and Vcom, a DC load is connected between the low voltage terminals VL and Vcom, and energy is consumed through a route from VH-Vcom to VL-Vcom.

Figure 4:
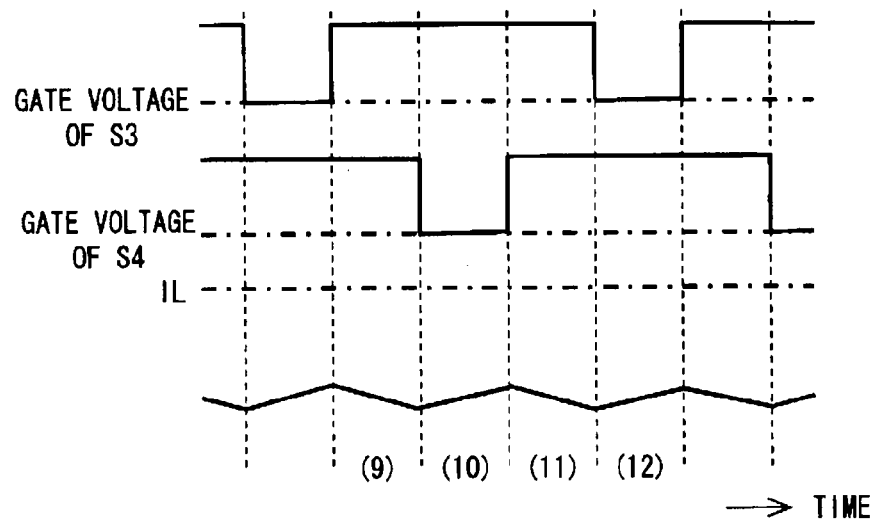
FIG. 4 shows the waveforms of the gate voltages and the waveform of the current IL of the reactor Lc in step-down operation according to embodiment 1 of the present invention in the case where a voltage is adjusted to a value in a range $1 \times V2 \geq V1 > 0.5 \times V2$.

FIG. 4 shows the voltage waveforms of the gate signals for the IGBTs S3 and S4, and the waveform of the current IL of the reactor Lc. Since the current IL is represented as a positive value in the step-up operation, the current IL is represented as a negative value in the step-down operation. Also here, in the stationary state, a voltage of 0.5×V2 is stored in the capacitor Cp. In the step-down operation, S1 and S2 are OFF, and S3 and S4 perform ON/OFF operation. The operation includes the following four modes.

When the gate voltage of S3 is high and the gate voltage of S4 is high (in a time interval (9) in FIG. 4), since S3 is ON and S4 is ON, energy transfers to the reactor Lc and the capacitor CL through the following route.

CH→S4→S3→Lc→CL→CH

That is, operation to store the energy by the reactor Lc is performed through conduction to the reactor Lc, the reactor Lc being directly connected between the high voltage terminals VH and Vcom not via the capacitor Cp.

When the gate voltage of S3 is high and the gate voltage of S4 is low (in a time interval (10) in FIG. 4), since S3 is ON and S4 is OFF, energy stored in the reactor Lc and energy stored in the capacitor Cp transfer to the capacitor CL through the following route.

Cp→S3→Lc→CL→D1→Cp

When the gate voltage of S3 is high and the gate voltage of S4 is high (in a time interval (11) in FIG. 4), since S3 is ON and S4 is ON, energy transfers to the reactor Lc and the capacitor CL through the following route.

CH→S4→S3→Lc→CL→CH

That is, also here, operation to store the energy by the reactor Lc is performed through conduction to the reactor Lc, the reactor Lc being directly connected between the high voltage terminals VH and Vcom not via the capacitor Cp.

When the gate voltage of S3 is low and the gate voltage of S4 is high (in a time interval (12) in FIG. 4), since S3 is OFF and S4 is ON, energy in the reactor Lc transfers to the capacitor CH and energy is stored in the capacitor Cp through the following route.

CH→S4→Cp→D2→Lc→CL→CH

The series of operations described above is repeated, whereby the voltage V2 that has been inputted is adjusted so as to be stepped down to the voltage V1 having a value in the range $1 \times V2 \geq V1 > 0.5 \times V2$, and the voltage V1 is outputted.

It is noted that in the above range, the case where V1 is equal to V2 corresponds to the case where both S3 and S4 are maintained in ON-state.

Next, the operation of stepping down the voltage V2 to the voltage V1 having a value in a range $V1 < 0.5 \times V2$, and outputting the voltage V1 between the low voltage terminals VL and Vcom, will be described. Also in this case, a DC load is connected between the low voltage terminals VL and Vcom, and energy is consumed through the route from VH-Vcom to VL-Vcom.

Figure 5:
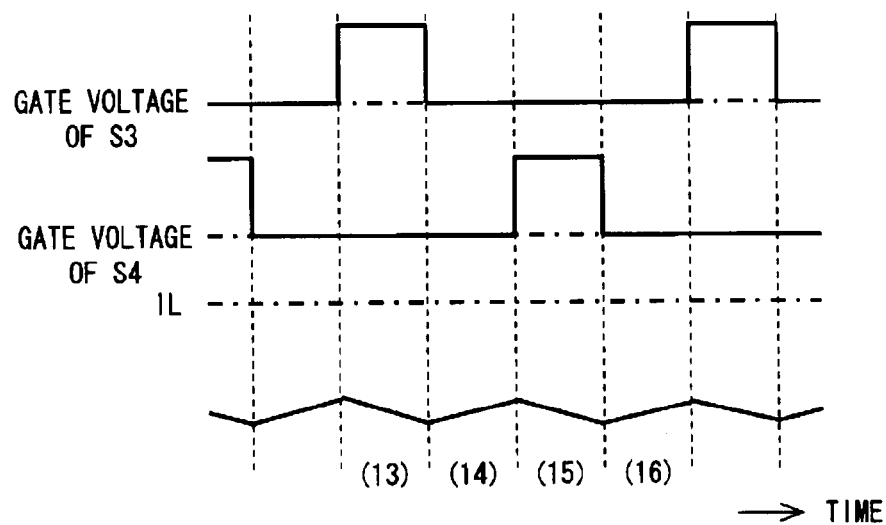
FIG. 5 shows the waveforms of the gate voltages and the waveform of the current IL of the reactor Lc in the step-down operation according to embodiment 1 of the present invention in the case where a voltage is adjusted to a value in a range $0.5 \times V2 > V1$.

FIG. 5 shows the voltage waveforms of the gate signals for the IGBTs S3 and S4, and the waveform of the current IL of the reactor Lc. Also here, the current IL is represented as a negative value. Also in this case, in the stationary state, a voltage of $0.5 \times V2$ is stored in the capacitor Cp. Similarly, in the step-down operation, S1 and S2 are OFF, and S3 and S4 perform ON/OFF operation. The operation includes the following four modes.

When the gate voltage of S3 is high and the gate voltage of S4 is low (in a time interval (13) in FIG. 5), since S3 is ON and S4 is OFF, energy in the capacitor Cp transfers to the capacitor CL and energy is stored in the reactor Lc through the following route.

Cp→S3→Lc→CL→D1→Cp

A divided voltage ($0.5 \times V2$) of the voltage V2 between the high voltage terminals VH and Vcom is stored in the capacitor Cp. Therefore, from the above route, it can be said that operation to store the energy by the reactor Lc is performed through conduction to the reactor Lc, the reactor Lc being connected, via the capacitor Cp, between the high voltage terminals VH and Vcom.

When the gate voltage of S3 is low and the gate voltage of S4 is low (in a time interval (14) in FIG. 5), since S3 is OFF and S4 is OFF, energy stored in the reactor Lc transfers to the capacitor CL through the following route.

Lc→CL→D1→D2→Lc

When the gate voltage of S3 is low and the gate voltage of S4 is high (in a time interval (15) in FIG. 5), since S3 is OFF and S4 is ON, energy in the capacitor CH transfers to the capacitor CL and is stored in the reactor Lc and the capacitor Cp through the following route.

CH→S4→Cp→D2→Lc→CL→CH

That is, also here, operation to store the energy by the reactor Lc is performed through conduction to the reactor Lc, the reactor Lc being connected, via the capacitor Cp, between the high voltage terminals VH and Vcom.

When the gate voltage of S3 is low and the gate voltage of S4 is low (in a time interval (16) in FIG. 5), since S3 is OFF and S4 is OFF, energy stored in the reactor Lc transfers to the capacitor CL through the following route.

Lc→CL→D1→D2→Lc

The series of operations described above is repeated, whereby the voltage V2 that has been inputted is adjusted so as to be stepped down to the voltage V1 having a value in the range $V1 < 0.5 \times V2$, and the voltage V1 is outputted.

The DC/DC power conversion apparatus of the present invention can perform step-up operation and step-down operation by performing the above-described operation.

Here, as previously described, if the current ripple of a reactor increases, loss in a magnetic material composing the reactor increases, and the temperature increases by heat generated in the reactor. As a result, the inductance value decreases and the reactor loses the function as a reactor, or the reactor is broken by heat. In addition, if the current ripple increase, electromagnetic noise and sound noise emitted from the reactor increase, whereby the peripheral components are adversely affected. In view of the above respects, it is necessary to make the current ripple of the reactor equal to or smaller than a certain value. Therefore, in conventional techniques, the switching frequency at which a switching device performs ON/OFF operation, and the inductance value of a reactor are selected such that the value of the current ripple is tolerable in any condition of the voltage ratio.

On the other hand, the DC/DC power conversion apparatus of the present invention, furthermore, changes the switching frequency at which the switching devices perform ON/OFF operation, in accordance with the input/output voltage ratio, thereby reducing the switching loss of the switching devices without causing variation in the magnitude of the current ripple of the reactor. Thus, the power consumption is reduced over a wide operation range of the DC/DC power conversion apparatus.

Next, in order to describe a manner of changing the switching frequency, relational expressions established among a switching frequency f, a peak-peak value ΔI of the current ripple, an inductance L of the reactor, and the voltages V1 and V2 in the step-up/step-down operation, will be derived.

The relational expressions differ depending on the step-up/step-down operation and the voltage conversion range thereof described with reference to FIGS. 2 to 5. Therefore, the relational expression for each of the cases will be derived below.

First, in FIG. 2, the case where the voltage V1 that has been inputted is adjusted so as to be stepped up to the voltage V2 having a value in the range $1 \times V1 \leq V2 < 2 \times V1$, and the voltage V2 is outputted, will be described.

A time interval during which the gate voltage of S1 or S2 is high (the time interval (1) or (3) in FIG. 2) is represented as Ton. A time interval from when S1 turns off to when S2 turns on (the time interval (2) in FIG. 2), and a time interval from when S2 turns off to when S1 turns on (the time interval (4) in FIG. 2) are represented as Toff. In this case, since the voltage of the capacitor Cp is 0.5×V2, expression (1) is established in the time interval Ton.

$$V1-V2/2=L\times\Delta I/Ton \quad (1)$$

In addition, expression (2) is established in the time interval Toff.

$$V2-V1=L\times\Delta I/Toff \quad (2)$$

Since a switching period T=1/f of the switching devices is the sum of the above time intervals, expression (3) is established.

$$T=1/f=2\times(Ton+Toff) \quad (3)$$

From expressions (1) to (3), the switching frequency f is represented by expression (4).

$$f=(V2-V1)\times(2V1-V2)/(2\times L\times\Delta I\times V2) \quad (4)$$

Next, in FIG. 3, the case where the voltage V1 that has been inputted is adjusted so as to be stepped up to the voltage V2 having a value in the range V2>2×V1, and the voltage V2 is outputted, will be described.

Of time intervals during which both gate voltages of S1 and S2 are high (both S1 and S2 are ON), a time interval from when S1 turns on to when S2 turns off (the time interval (5) in FIG. 3), and a time interval from when S2 turns on to when S1 turns off (the time interval (7) in FIG. 3) are represented as Ton. A time interval during which S1 or S2 is OFF (the time interval (6) or (8) in FIG. 3) is represented as Toff. In this case, expression (5) is established in the time interval Ton.

$$V1=L\times\Delta I/Ton \quad (5)$$

Since the voltage of the capacitor Cp is 0.5×V2, expression (6) is established in the time interval Toff.

$$V2-V2/2-V1=L\times\Delta I/Toff \quad (6)$$

From expressions (5), (6), and (3), the switching frequency f is represented by expression (7).

$$f=V1\times(V2-2\times V1)/(2\times L\times\Delta I\times V2) \quad (7)$$

Next, in FIG. 4, the case where the voltage V2 that has been inputted is adjusted so as to be stepped down to the voltage V1 having a value in the range 1×V2≥V1>0.5×V2, and the voltage V1 is outputted, will be described.

Of time intervals during which both gate voltages of S3 and S4 are high (both S3 and S4 are ON), a time interval from when S3 turns on to when S4 turns off (the time interval (9) in FIG. 4), and a time interval from when S4 turns on to when S3 turns off (the time interval (11) in FIG. 4) are represented as Ton. A time interval during which S3 or S4 is OFF (the time interval (10) or (12) in FIG. 4) is represented as Toff. In this case, expression (8) is established in the time interval Ton, and expression (9) is established in the time interval Toff.

$$V2-V1=L\times\Delta I/Ton \quad (8)$$

$$V1-V2/2=L\times\Delta I/Toff \quad (9)$$

From expressions (8), (9), and (3), the switching frequency f is represented by expression (10).

$$f=(V2-V1)\times(2V1-V2)/(2\times L\times\Delta I\times V2) \quad (10)$$

Next, in FIG. 5, the case where the voltage V2 that has been inputted is adjusted so as to be stepped down to the voltage V1 having a value in the range V1<0.5×V2, and the voltage V1 is outputted, will be described.

A time interval during which the gate voltage of S3 or S4 is high (the time interval (13) or (15) in FIG. 5) is represented as Ton. A time interval from when S3 turns off to when S4 turns on (the time interval (14) in FIG. 5), and a time interval from when S4 turns off to when S3 turns on (the time interval (16) in FIG. 5) are represented as Toff. In this case, expression (11) is established in the time interval Ton, and expression (12) is established in the time interval Toff.

$$V2-V2/2-V1=L\times\Delta I/Ton \quad (11)$$

$$V1=L\times\Delta I/Toff \quad (12)$$

From expressions (11), (12), and (3), the switching frequency f is represented by expression (13).

$$f=V1\times(V2-2\times V1)/(2\times L\times\Delta I\times V2) \quad (13)$$

Considering that expression (4) is the same as expression (10) and that expression (7) is the same as expression (13), if the voltage ratio (V2/V1) is represented as k, the switching frequency f is represented by expressions (14) and (15) based on the range of the voltage ratio k irrespective of step-up/step-down operation.

If 1≤k<2:

$$f=(V1/(2\times L\times\Delta I))\times(k-1)\times(2-k)/k \quad (14)$$

If k>2:

$$f=(V1/(2\times L\times\Delta I))\times(k-2)/k \quad (15)$$

Therefore, a value tolerable as the current ripple ΔI of the reactor is inputted to the control circuit 120, and the control circuit 120 changes the switching frequency f to a value calculated by expression (14) or (15) in accordance with the voltage ratio k, whereby switching loss of the switching devices is reduced without causing variation in the magnitude of the current ripple of the reactor, and the power consumption is reduced over a wide operation range of the DC/DC power conversion apparatus.

In addition, owing to the reduction of the power consumption, load of cooling the apparatus is reduced, whereby reduction of the size and the weight of the apparatus is realized and the durability of the apparatus is improved.

Figure 6:
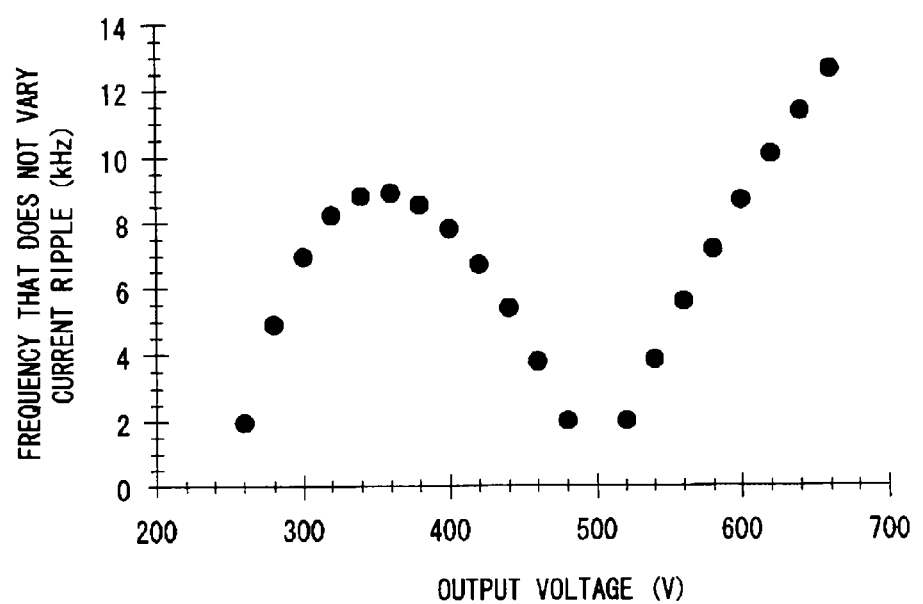
FIG. 6 shows the relationship between an output voltage and a switching frequency that does not vary the magnitude of a current ripple of the reactor Lc in the step-up operation according to embodiment 1 of the present invention.

As a specific example, in the step-up operation, if V1 is 250 V, ΔI is 24 A, and L is 100 μH, the relationship between the output voltage V2 and the switching frequency that makes the current ripple constant is as shown in FIG. 6. As shown in FIG. 6, if a voltage of 350 V is to be outputted, the switching frequency of about 9 kHz is needed, but if a voltage of 520 V is to be outputted, the switching frequency of as low as about 2 kHz is needed.

Therefore, it is possible to make the switching frequency low around the output of 500 V. As a result, switching loss of the IGBTs is reduced and thus operation with small loss can be performed.

According to the above voltage condition, if the output is in a range from 250 V to 350 V, the frequency is increased in accordance with the increase in the voltage. If the output is in a range from 350 V to 500 V, the frequency is decreased in accordance with the increase in the voltage. If the output is equal to or larger than 500 V, the frequency is increased in accordance with the increase in the voltage. If the DC/DC power conversion apparatus is operated in this manner, the DC/DC power conversion apparatus has an operation region in which loss is small, in its operation region. Therefore, the power consumption can be greatly reduced in comparison with the case where the DC/DC power conversion apparatus is operated at a constant frequency.

Similarly, also in the step-down operation, by using the above expressions, the DC/DC power conversion apparatus is operated at the switching frequency determined in accordance with the input/output voltage ratio, whereby the power consumption can be greatly reduced.

It is noted that expressions (14) and (15) are not applied in the case where the voltage ratio k is 2. In order to obtain an output with the voltage ratio of k=2, practically, if the switching frequency f is set at a sufficiently low value, e.g., several hundred Hz or about 1 kHz, the DC/DC power conversion apparatus can be operated with small loss without causing increase in the current ripple.

As described above, in the case where only the step-up operation is performed, S3 and S4 are not needed, and in the case where only the step-down operation is performed, S1 and S2 are not needed. Therefore, only one of the two functions is needed, the switching devices that are not needed may be omitted.

Embodiment 2

Hereinafter, a DC/DC power conversion apparatus according to embodiment 2 of the present invention will be described. The circuit configuration of the DC/DC power conversion apparatus of embodiment 2 is partially different from that of the DC/DC power conversion apparatus of embodiment 1, but the control operation for step-up operation and step-down operation of embodiment 2 is not basically different from that of embodiment 1.

Figure 7:
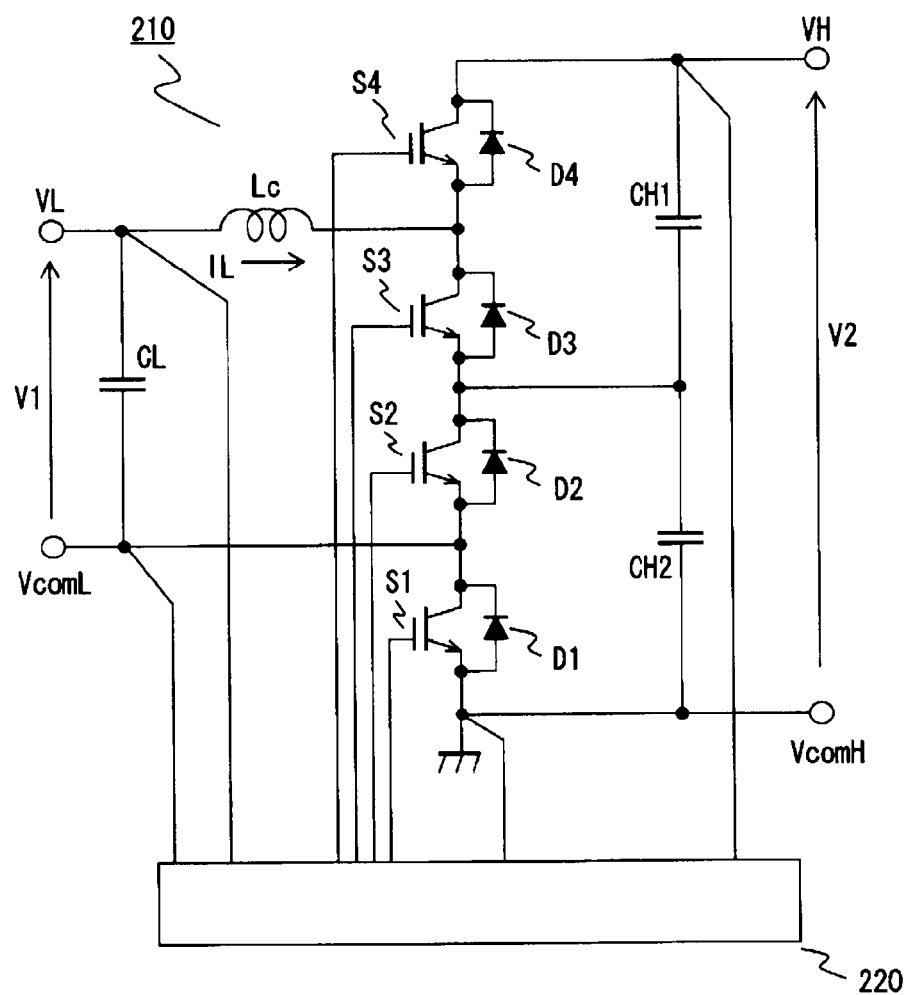
FIG. 7 shows the circuit configuration of a DC/DC power conversion apparatus of embodiment 2 of the present invention.

FIG. 7 shows the circuit configuration of the DC/DC power conversion apparatus according to embodiment 2 of the present invention. As shown in FIG. 7, the DC/DC power conversion apparatus has a DC/DC power conversion function of converting a voltage V1 inputted between low voltage terminals VL and VcomL into a voltage V2 which has been stepped up and is equal to or larger than the voltage V1, and outputting the voltage V2 between high voltage terminals VH and VcomH (step-up operation). In addition, the DC/DC power conversion apparatus has a DC/DC power conversion function of converting a voltage V2 inputted between the high voltage terminals VH and VcomH into a voltage V1 which has been stepped down and is equal to or smaller than the voltage V2, and outputs the voltage V1 between the low voltage terminals VL and VcomL (step-down operation).

The DC/DC power conversion apparatus includes a main circuit 210 and a control circuit 220. The main circuit 210 includes: smoothing capacitors CL, CH1, and CH2 for smoothing the input voltage V1 and the output voltage V2; the four IGBTs S1 to S4 (hereinafter, abbreviated as S1 etc. as appropriate) as switching devices; the four first to fourth rectification devices D1 to D4 (hereinafter, abbreviated as D1 etc. as appropriate) connected in parallel to the respective IGBTs so as to have conduction directions opposite to those of the IGBTs; and the reactor Lc connected between the low voltage terminal VL and the switching device group including the IGBTs and the rectification devices.

It is noted that the smoothing capacitors CH1 and CH2 also function as capacitors for retaining divided voltages of the voltage V2 between the high voltage terminals VH and VcomH.

Next, the details of the connection of the circuit will be described. Both the terminals of the smoothing capacitor CL are connected to the low voltage terminals VL and VcomL, respectively. The high-voltage-side terminal of the smoothing capacitor CH1 is connected to the high voltage terminal VH, and the low-voltage-side terminal of the smoothing capacitor CH1 is connected to the high-voltage-side terminal of the smoothing capacitor CH2. The low-voltage-side terminal of the smoothing capacitor CH2 is connected to the high voltage terminal VcomH. The high voltage terminal VcomH is grounded.

The emitter terminal of S1 is connected to the high voltage terminal VcomH, and the collector terminal of S1 is connected to the emitter terminal of S2 and to the low voltage terminal VcomL. The collector terminal of S2 is connected to the emitter terminal of S3. The collector terminal of S3 is connected to the emitter terminal of S4, and the collector terminal of S4 is connected to the high voltage terminal VH. The anode terminal of D1 is connected to the emitter terminal of S1, and the cathode terminal of D1 is connected to the collector terminal of S1. The anode terminal of D2 is connected to the emitter terminal of S2, and the cathode terminal of D2 is connected to the collector terminal of S2. The anode terminal of D3 is connected to the emitter terminal of S3, and the cathode terminal of D3 is connected to the collector terminal of S3. The anode terminal of D4 is connected to the emitter terminal of S4, and the cathode terminal of D4 is connected to the collector terminal of S4.

The reactor Lc is connected between the low voltage terminal VL and the series connection point between a parallel unit of S3 and D3 and a parallel unit of S4 and D4. The smoothing capacitor CH1 is connected in parallel to a series unit in which the parallel unit of S3 and D3 and the parallel unit of S4 and D4 are connected in series to each other. The smoothing capacitor CH2 is connected in parallel to a series unit in which the parallel unit of S1 and D1 and the parallel unit of S2 and D2 are connected in series to each other.

The gate terminals of S1, S2, S3, and S4, and the voltage terminals VH, VL, VcomL, and VcomH are connected to the control circuit 220. Gate signals are inputted to the respective gate terminals of S1, S2, S3, and S4, based on the respective voltages of the emitter terminals of the IGBTs as references.

Next, operations will be described. First, the step-up operation will be described. The operation of the DC/DC power conversion apparatus differs between when the relationship between the input voltage and the output voltage indicates that V2 is equal to or larger than 1×V1 and is smaller than 2×V1, and when the relationship indicates that V2 is larger than 2×V1. First, the operation of stepping up the voltage V1 to the voltage V2 having a value in the range 1×V1≤V2<2×V1, and outputting the voltage V2 between the high voltage terminals VH and VcomH, will be described.

In this case, a DC power supply having the voltage V1 (the smoothing capacitor CL is assumed to have a large capacity and the power supply may be regarded as a DC power supply in the operation during a predetermined time period) is connected between the low voltage terminals VL and VcomL, a DC load is connected between the high voltage terminals VH and VcomH, and energy is consumed through a route from VL-VcomL to VH-VcomH.

Figure 8:
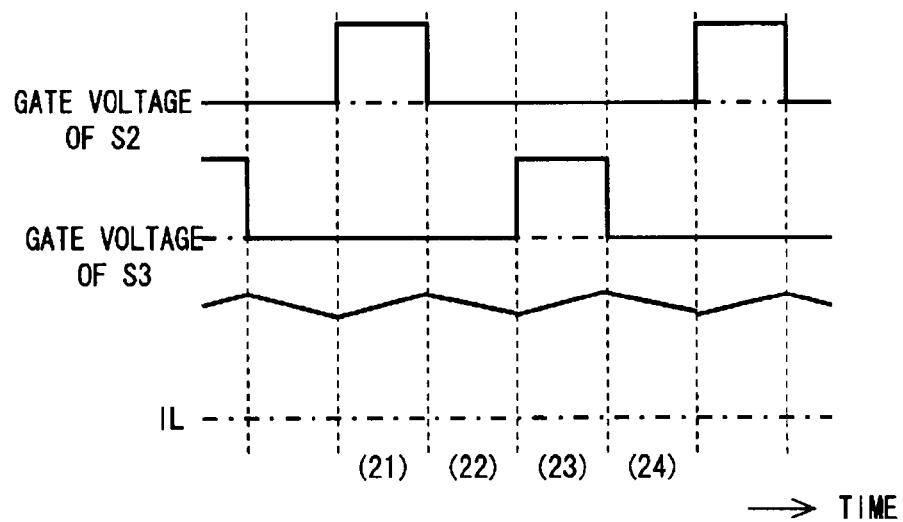
FIG. 8 shows the waveforms of the gate voltages and the waveform of the current IL of the reactor Lc in step-up operation according to embodiment 2 of the present invention in the case where a voltage is adjusted to a value in the range $1 \times V1 \leq V2 < 2 \times V1$.

FIG. 8 shows the voltage waveforms of the gate signals for the IGBTs S2 and S3, and the waveform of the current IL of the reactor Lc. It is noted that each IGBT turns on when the gate signal has a high voltage. In the stationary state, voltages of 0.5×V2 are stored in the smoothing capacitors CH1 and CH2. In the step-up operation, S1 and S4 are OFF, and S2 and S3 perform ON/OFF operation. The operation includes the following four modes.

When the gate voltage of S2 is high and the gate voltage of S3 is low (in a time interval (21) in FIG. 8), since S2 is ON and S3 is OFF, energy transfers to the capacitor CH1 and energy is stored in the reactor Lc through the following route.

CL→Lc→D4→CH1→S2→CL

That is, operation to store the energy by the reactor Lc is performed through conduction to the reactor Lc, the reactor Lc being connected to the smoothing capacitor CL, i.e., between the low voltage terminals VL and VcomL, via the smoothing capacitor CH1 functioning as a voltage division capacitor.

When the gate voltage of S2 is low and the gate voltage of S3 is low (in a time interval (22) in FIG. 8), since S2 is OFF and S3 is OFF, energy stored in the reactor Lc transfers to the smoothing capacitors CH1 and CH2 through the following route.

CL→Lc→D4→CH1→CH2→D1→CL

When the gate voltage of S2 is low and the gate voltage of S3 is high (in a time interval (23) in FIG. 8), since S2 is OFF and S3 is ON, energy transfers to the smoothing capacitor CH2 and energy is stored in the reactor Lc through the following route.

CL→Lc→S3→CH2→D1→CL

That is, also here, operation to store the energy by the reactor Lc is performed through conduction to the reactor Lc, the reactor Lc being connected, via the smoothing capacitor CH2 functioning as a voltage division capacitor, between the low voltage terminals VL and VcomL.

When the gate voltage of S2 is low and the gate voltage of S3 is low (in a time interval (24) in FIG. 8), since S2 is OFF and S3 is OFF, energy stored in the reactor Lc transfers to the smoothing capacitors CH1 and CH2 through the following route.

CL→Lc→D4→CH1→CH2→D1→CL

The series of operations described above is repeated, whereby the voltage V1 that has been inputted is adjusted so as to be stepped up to the voltage V2 having a value in the range $1 \times V1 \leq V2 < 2 \times V1$, and the voltage V2 is outputted.

It is noted that in the above range, the case where V1 is equal to V2 corresponds to the case where both S2 and S3 are maintained in OFF-state.

Next, the operation of stepping up the voltage V1 to the voltage V2 having a value in the range $V2 > 2 \times V1$, and outputting the voltage V2 between the high voltage terminals VH and VcomH, will be described. Also in this case, a DC load is connected between the high voltage terminals VH and VcomH, and energy is consumed through the route from VL-VcomL to VH-VcomH.

Figure 9:
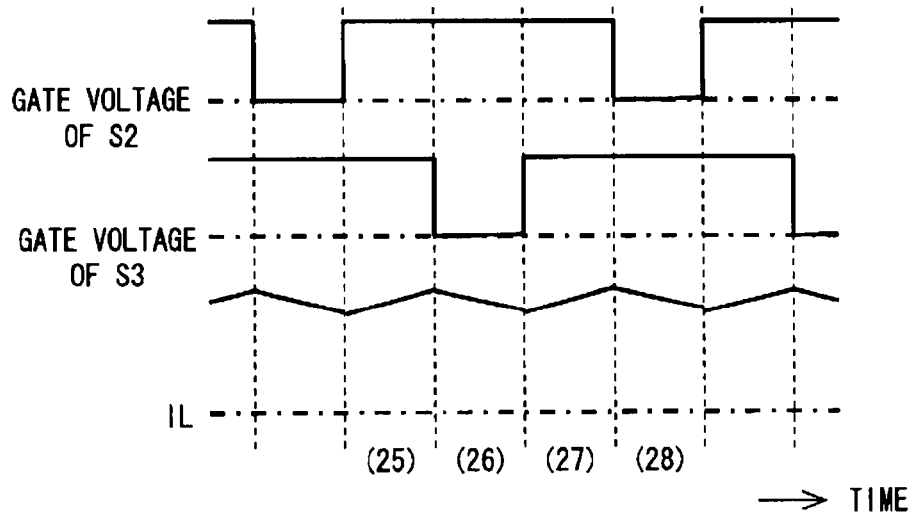
FIG. 9 shows the waveforms of the gate voltages and the waveform of the current IL of the reactor Lc in the step-up operation according to embodiment 2 of the present invention in the case where a voltage is adjusted to a value in the range $2 \times V1 < V2$.

FIG. 9 shows the voltage waveforms of the gate signals for the IGBTs S2 and S3, and the waveform of the current IL of the reactor Lc. Also in this case, in the stationary state, voltages of $0.5 \times V2$ are stored in the smoothing capacitors CH1 and CH2. Similarly, in the step-up operation, S1 and S4 are OFF, and S2 and S3 perform ON/OFF operation. The operation includes the following four modes.

When the gate voltage of S2 is high and the gate voltage of S3 is high (in a time interval (25) in FIG. 9), since S2 is ON and S3 is ON, energy transfers to the reactor Lc through the following route.

CL→Lc→S3→S2→CL

That is, operation to store the energy by the reactor Lc is performed through conduction to the reactor Lc, the reactor Lc being directly connected between the low voltage terminals VL and VcomL not via the smoothing capacitors CH1 and CH2.

When the gate voltage of S2 is high and the gate voltage of S3 is low (in a time interval (26) in FIG. 9), since S2 is ON and S3 is OFF, energy stored in the reactor Lc transfers to the capacitor CH1 through the following route.

CL→Lc→D4→CH1→S2→CL

When the gate voltage of S2 is high and the gate voltage of S3 is high (in a time interval (27) in FIG. 9), since S2 is ON and S3 is ON, energy transfers to the reactor Lc through the following route.

CL→Lc→S3→S2→CL

That is, also here, operation to store the energy by the reactor Lc is performed through conduction to the reactor Lc, the reactor Lc being directly connected between the low voltage terminals VL and VcomL not via the smoothing capacitors CH1 and CH2.

When the gate voltage of S2 is low and the gate voltage of S3 is high (in a time interval (28) in FIG. 9), since S2 is OFF and S3 is ON, energy stored in the reactor Lc transfers to the capacitor CH2 through the following route.

CL→LC→S3→CH2→D1→CL

The series of operations described above is repeated, whereby the voltage V1 that has been inputted is adjusted so as to be stepped up to the voltage V2 having a value in the range $V2 > 2 \times V1$, and the voltage V2 is outputted.

Next, the step-down operation will be described. Also the step-down operation differs between when the relationship between the input voltage and the output voltage indicates that V2 is equal to or larger than $1 \times V1$ and is smaller than $2 \times V1$, and when the relationship indicates that V2 is larger than $2 \times V1$. First, the operation of stepping down the voltage V2 to the voltage V1 having a value in a range $1 \times V2 \geq V1 > 0.5 \times V2$, and outputting the voltage V1 between the low voltage terminals VL and VcomL, will be described.

In this case, a DC power supply having the voltage V2 (the smoothing capacitors CH1 and CH2 are assumed to have large capacities and the power supply may be regarded as a DC power supply in the operation during a predetermined time period) is connected between the high voltage terminals VH and VcomH, a DC load is connected between the low voltage terminals VL and VcomL, and energy is consumed through a route from VH-VcomH to VL-VcomL.

Figure 10:
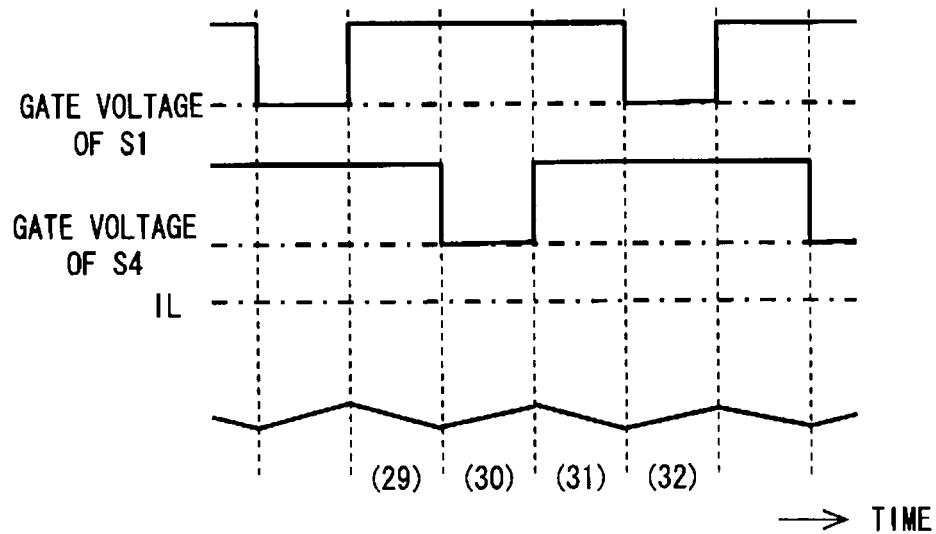
FIG. 10 shows the waveforms of the gate voltages and the waveform of the current IL of the reactor Lc in step-down operation according to embodiment 2 of the present invention in the case where a voltage is adjusted to a value in a range $1 \times V2 \geq V1 > 0.5 \times V2$.

FIG. 10 shows the voltage waveforms of the gate signals for the IGBTs S1 and S4, and the waveform of the current IL of the reactor Lc. Since the current IL is represented as a positive value in the step-up operation, the current IL is represented as a negative value in the step-down operation. Also here, in the stationary state, voltages of $0.5 \times V2$ are stored in the smoothing capacitors CH1 and CH2. In the step-down operation, S2 and S3 are OFF, and S1 and S4 perform ON/OFF operation. The operation includes the following four modes.

When the gate voltage of S1 is high and the gate voltage of S4 is high (in a time interval (29) in FIG. 10), since S1 is ON and S4 is ON, energy transfers to the reactor Lc through the following route.

(CH2→CH1)→S4→Lc→CL→S1→(CH2→CH1)

A series unit of the smoothing capacitors CH1 and CH2 is also regarded as a DC power supply connected between the high voltage terminals VH and VcomH. Therefore, from the above route, it can be said that operation to store the energy by the reactor Lc is performed through conduction to the reactor Lc, the reactor Lc being directly connected between the high voltage terminals VH and Vcom (not via the smoothing capacitors CH1 and CH2 functioning as voltage division capacitors).

When the gate voltage of S1 is high and the gate voltage of S4 is low (in a time interval (30) in FIG. 10), since S1 is ON and S4 is OFF, energy stored in the reactor Lc transfers to the capacitor CL through the following route.

CH2→D3→Lc→CL→S1→CH2

When the gate voltage of S1 is high and the gate voltage of S4 is high (in a time interval (31) in FIG. 10), since S1 is ON and S4 is ON, energy transfers to the reactor Lc through the following route.

(CH2→CH1)→S4→Lc→CL→S1→(CH2→CH1)

That is, also here, operation to store the energy by the reactor Lc is performed through conduction to the reactor Lc, the reactor Lc being directly connected between the high voltage terminals VH and VcomH (not via the smoothing capacitors CH1 and CH2 functioning as voltage division capacitors).

When the gate voltage of S1 is low and the gate voltage of S4 is high (in a time interval (32) in FIG. 10), since S1 is OFF and S4 is ON, energy in the reactor Lc transfers to the capacitor CL through the following route.

CH1→S4→Lc→CL→D2→CH1

The series of operations described above is repeated, whereby the voltage V2 that has been inputted is adjusted so as to be stepped down to the voltage V1 having a value in the range 1×V2≥V1>0.5×V2, and the voltage V1 is outputted.

It is noted that in the above range, the case where V1 is equal to V2 corresponds to the case where both S1 and S4 are maintained in ON-state.

Next, the operation of stepping down the voltage V2 to the voltage V1 having a value in the range V1<0.5×V2, and outputting the voltage V1 between the low voltage terminals VL and VcomL, will be described.

Also in this case, a DC load is connected between the low voltage terminals VL and VcomL, and energy is consumed through the route from VH-VcomH to VL-VcomL.

Figure 11:
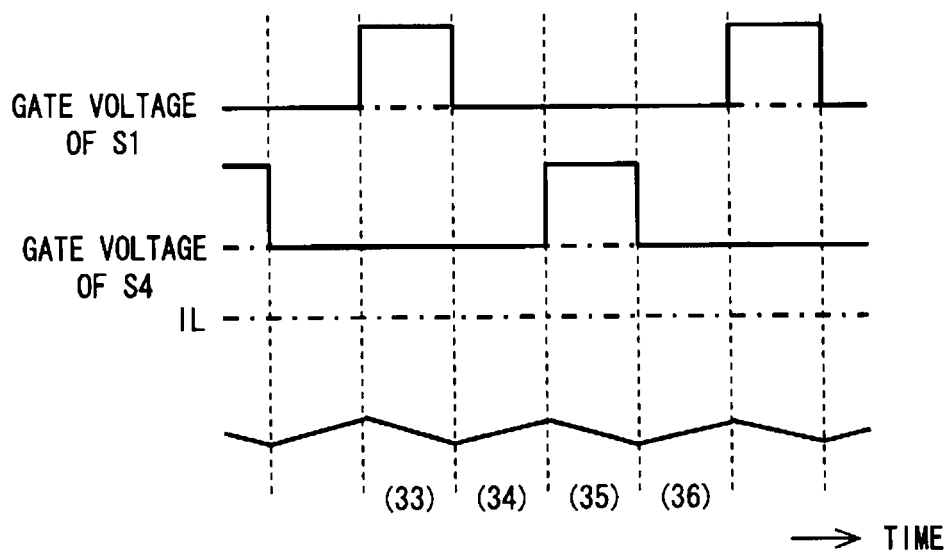
FIG. 11 shows the waveforms of the gate voltages and the waveform of the current IL of the reactor Lc in the step-down operation according to embodiment 2 of the present invention in the case where a voltage is adjusted to a value in a range $0.5 \times V2 > V1$.

FIG. 11 shows the voltage waveforms of the gate signals for the IGBTs S1 and S4, and the waveform of the current IL of the reactor Lc. Also here, the current IL is represented as a negative value. Also in this case, in the stationary state, voltages of 0.5×V2 are stored in the smoothing capacitors CH1 and CH2. Similarly, in the step-down operation, S2 and S3 are OFF, and S1 and S4 perform ON/OFF operation. The operation includes the following four modes.

When the gate voltage of S1 is high and the gate voltage of S4 is low (in a time interval (33) in FIG. 11), since S1 is ON and S4 is OFF, energy transfers to the capacitor CL and energy is stored in the reactor Lc through the following route.

CH2→D3→Lc→CL→S1→CH2

A divided voltage (0.5×V2) of the voltage V2 between the high voltage terminals VH and VcomH is stored in the smoothing capacitor CH2. Therefore, from the above route, it can be said that operation to store the energy by the reactor Lc is performed through conduction to the reactor Lc, the reactor Lc being connected, via the smoothing capacitor CH2 functioning as a voltage division capacitor, between the high voltage terminals VH and VcomH.

When the gate voltage of S1 is low and the gate voltage of S4 is low (in a time interval (34) in FIG. 11), since S1 is OFF and S4 is OFF, energy stored in the reactor Lc transfers to the capacitor CL through the following route.

Lc→CL→D2→D3→Lc

When the gate voltage of S1 is low and the gate voltage of S4 is high (in a time interval (35) in FIG. 11), since S1 is OFF and S4 is ON, energy transfers to the capacitor CL and is stored in the reactor Lc through the following route.

CH1→S4→Lc→CL→D2→CH1

That is, also here, operation to store the energy by the reactor Lc is performed through conduction to the reactor Lc, the reactor Lc being connected, via the smoothing capacitor CH1 functioning as a voltage division capacitor, between the high voltage terminals VH and VcomH.

When the gate voltage of S1 is low and the gate voltage of S4 is low (in a time interval (36) in FIG. 11), since S1 is OFF and S4 is OFF, energy stored in the reactor Lc transfers to the capacitor CL through the following route.

Lc→CL→D2→D3→Lc

The series of operations described above is repeated, whereby the voltage V2 that has been inputted is adjusted so as to be stepped down to the voltage V1 having a value in the range V1<0.5×V2, and the voltage V1 is outputted.

Also the DC/DC power conversion apparatus of embodiment 2 can perform step-up operation and step-down operation by performing the above-described operation, as in embodiment 1. In addition, based on the same principle as in embodiment 1, expressions (14) and (15) are established among the switching frequency f, the peak-peak value ΔI of the current ripple, the inductance L of the reactor, the voltages V1 and V2 in the step-up/step-down operation, and the voltage ratio k.

Therefore, in embodiment 2, a value tolerable as the current ripple ΔI of the reactor is inputted to the control circuit 220, and the control circuit 220 changes the switching frequency f to a value calculated by expression (14) or (15) in accordance with the voltage ratio k, whereby switching loss of the switching devices is reduced without causing variation in the magnitude of the current ripple of the reactor, and the power consumption is reduced over a wide operation range of the DC/DC power conversion apparatus.

As described above, in the case where only the step-up operation is performed, S1 and S4 are not needed, and in the case where only the step-down operation is performed, S2 and S3 are not needed. Therefore, only one of the two functions is needed, the switching devices that are not needed may be omitted.

Embodiment 3

In embodiment 1, as described above, it is necessary to continuously vary the switching frequency f such that the magnitude of the current ripple is constant, based on expressions (14) and (15). Therefore, there is an aspect that complicated control is needed. In addition, in the case where the voltage ratio k is 2, the effective switching frequency f cannot be obtained from either of the expressions. Therefore, also as described above, in the case where the DC/DC power conversion apparatus is to be operated with the voltage ratio of about k=2, it is necessary to make a particular consideration for control in which the switching frequency f is set at an extremely low value.

Embodiment 3 of the present invention has been made in consideration of the above respects. In embodiment 3, instead of varying the switching frequency f in accordance with the voltage ratio k, the switching frequency f is changed to several fixed values, and the inductance value L of the reactor is set at a value that is not very large (the size of the reactor is not very large), so that the current ripple can be suppressed to be equal to or smaller than a certain value, and the power consumption can be reduced in an operation region in which the switching frequency is low.

The circuit configuration of the present embodiment is the same as that shown in FIG. 1, and therefore, the description thereof is omitted here. Similarly, the DC/DC power conversion apparatus has a DC/DC power conversion function of converting a voltage V1 inputted between low voltage terminals VL and Vcom into a voltage V2 which has been stepped up and is equal to or larger than the voltage V1, and outputting the voltage V2 between high voltage terminals VH and Vcom (step-up operation). In addition, the DC/DC power conversion apparatus has a DC/DC power conversion function of converting a voltage V2 inputted between the high voltage terminals VH and Vcom into a voltage V1 which has been stepped down and is equal to or smaller than the voltage V2, and outputs the voltage V1 between the low voltage terminals VL and Vcom (step-down operation).

The step-up operation and the step-down operation are as described above in embodiment 1, and therefore, the description thereof is omitted here. In the present embodiment, the range of the voltage ratio k is divided into a plurality of operation regions, two kinds of different switching frequencies are set for the operation regions, and the switching frequency f is switched in accordance with the operation regions, i.e., in accordance with the voltage ratio k. This method and its effect will be described here.

Figure 12:
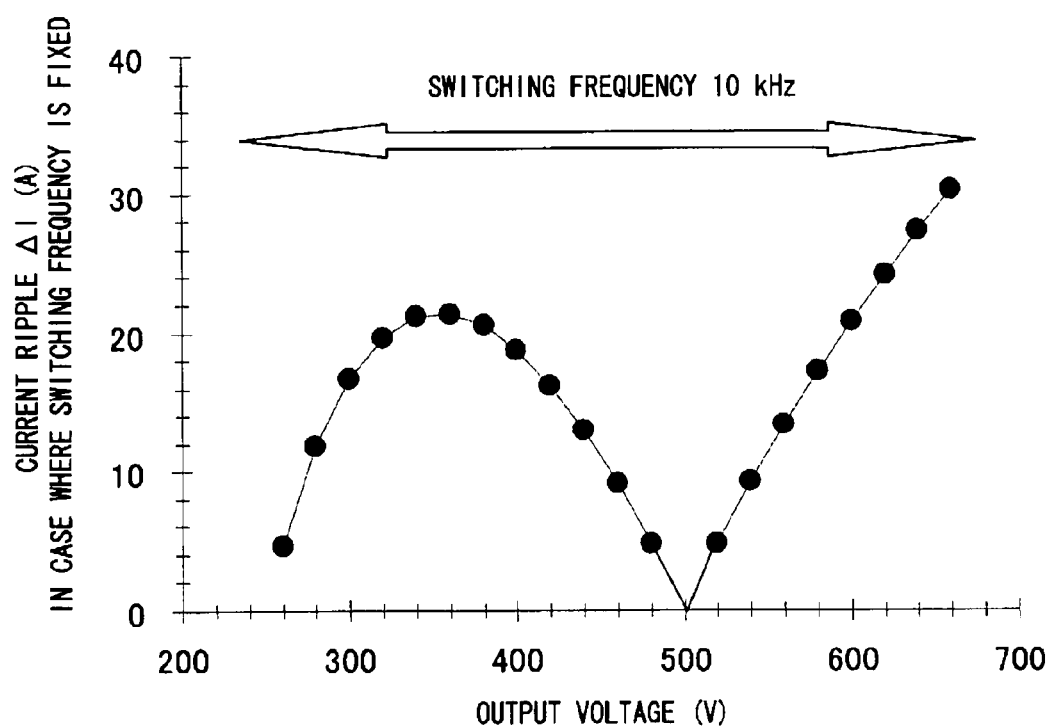
FIG. 12 shows the relationship between an output voltage and a current ripple in the case where the switching frequency is fixed over the entire range of voltage ratios, as a premise for explaining step-up operation of a DC/DC power conversion apparatus according to embodiment 3 of the present invention.

First, as a premise, FIG. 12 shows the relationship between the output voltage and the current ripple ΔI (the difference between the maximum value and the minimum value) in the step-up operation with the switching frequency f fixed at 10 kHz. Here, V1 is 250 V, and L of the reactor is 100 μH.

As shown in FIG. 12, in a range of the output voltage from 260 V to 660 V, the current ripple has a local maximum at 375 V (1.5×250 V), and the minimum value at 500 V (2×250 V). In a range over 500 V, the current ripple increases depending on the value of the output voltage, and has the maximum value of 30.3 A at 660 V.

Figure 13:
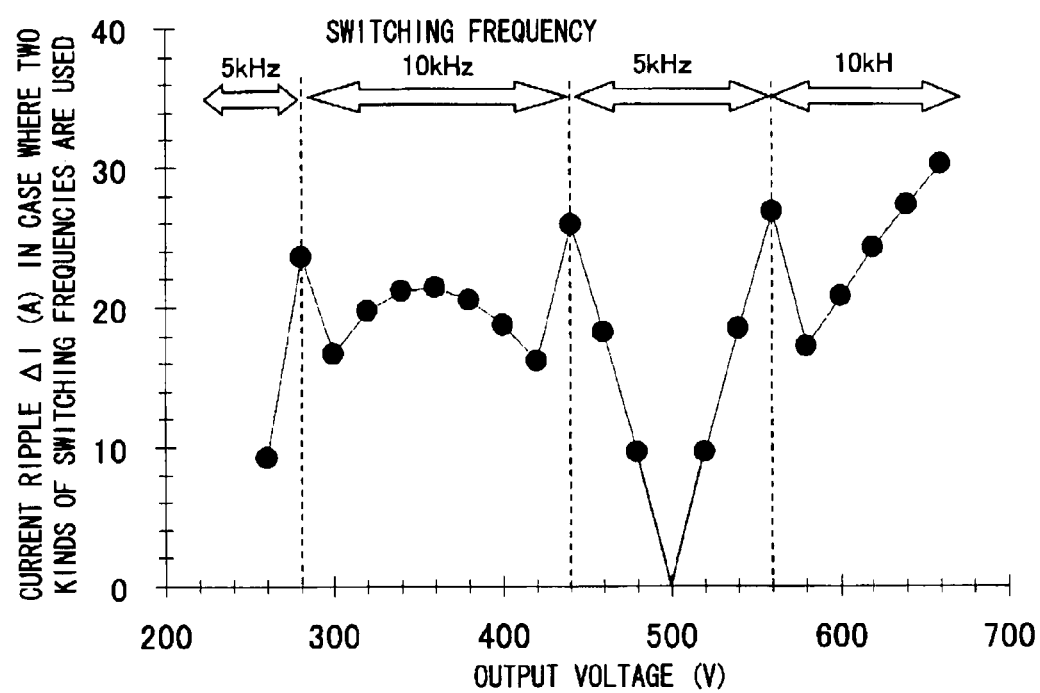
FIG. 13 shows the relationship between the output voltage and the current ripple in the case where the switching frequency is switched between two kinds of values in the entire range of voltage ratios, for explaining the step-up operation of the DC/DC power conversion apparatus according to embodiment 3 of the present invention.

Next, FIG. 13 shows the relationship between the output voltage and the current ripple ΔI in the case where the switching frequency f is set at 5 kHz in an operation region from 260 V to 280 V, 10 kHz in an operation region from 280 V to 440 V, 5 kHz in an operation region from 440 V to 560 V, and 10 kHz in an operation region from 560 V to 660 V. If the DC/DC power conversion apparatus is operated with the switching frequency selected in this manner, it becomes possible to operate the DC/DC power conversion apparatus at the switching frequency f=5 kHz in the operation region from 260 V to 280 V and the operation region from 440 V to 560 V while the current ripple of the reactor is suppressed to be equal to or smaller than a limiting value of 30.3 A.

In addition, since the power consumption can be reduced in the operation regions corresponding to the switching frequency f=5 kHz, the power consumption in the entire operation voltage range can be reduced, and load of cooling the apparatus is reduced, whereby reduction of the size and the weight of the apparatus is realized and the durability of the apparatus is improved. In addition, control is simplified as a whole.

In the above example, there are three frequency switching points in the entire operation voltage range. However, if the operation voltage range is from 440 V to 660 V, there are two frequency switching points. In addition, in the above example, two kinds of frequencies are used. However, if the number of kinds of frequencies is increased to three, four, or more, the current ripple can be suppressed to a smaller value, and the power consumption can be further reduced.

In the above example, the step-up operation has been described. However, also the step-down operation can be performed in the same manner, and the same effect can be obtained. In addition, also in the case of using the DC/DC power conversion apparatus of embodiment 2, the same operation can be performed, and the same effect can be obtained.

In addition, as described in embodiments 1 and 2, in the case of using only one of the step-up operation and the step-down operation, the switching devices that are not needed may be omitted.

The invention claimed is:

1. A DC/DC power conversion apparatus comprising:
high voltage terminals;
low voltage terminals;
a device series unit including a plurality of rectification devices connected in series to each other, the device series unit being connected between the high voltage terminals;
switching devices connected in parallel to all or some of the plurality of rectification devices, respectively;
at least one capacitor for retaining a divided voltage of a voltage between the high voltage terminals, the at least one capacitor being connected in parallel to the plurality of the rectification devices;
a reactor for, in accordance with switching operation of the switching devices, allowing conduction and performing operation to store or release energy, one end of the reactor being connected to one of the low voltage terminals, and the other end being connected to a series connection point among the plurality of rectification devices; and
a control circuit for, by controlling ON/OFF operation of the switching devices, controlling DC voltage conversion between the voltage between the high voltage terminals and a voltage between the low voltage terminals,
wherein with the voltage ratio k being the voltage between the high voltage terminals divided by the voltage between the low voltage terminals, the range of the voltage ratio k for executing the DC voltage conversion is divided into a plurality of operation regions and the plurality of operation regions include an operation region including the voltage ratio k=2; and
wherein the control circuit sets, in accordance with the operation regions of the DC voltage conversion, a switching frequency at which the switching devices perform ON/OFF operation, such that the magnitude of a current ripple flowing in the reactor is equal to or smaller than a predetermined limiting value irrespective of the operation regions and the switching frequency set for the operation region including k=2 is equal to or lower than the switching frequencies set for the other operation regions.

2. The DC/DC power conversion apparatus according to claim 1, wherein
the device series unit includes first to fourth rectification devices connected in series to each other in order from low potential side to high potential side,
the low voltage terminals are connected in parallel to a series unit including the first rectification device and the second rectification device, via the reactor,
the capacitor is connected in parallel to a series unit including the second rectification device and the third rectification device, and
the switching devices are connected in parallel to the first to fourth rectification devices, respectively, thereby allowing both step-up operation of stepping up the voltage between the low voltage terminals to the voltage between the high voltage terminals, and step-down operation of stepping down the voltage between the high voltage terminals to the voltage between the low voltage terminals.

3. The DC/DC power conversion apparatus according to claim 1, wherein
the device series unit includes first to fourth rectification devices connected in series to each other in order from low potential side to high potential side,
the low voltage terminals are connected in parallel to a series unit including the first rectification device and the second rectification device, via the reactor, the capacitor is connected in parallel to a series unit including the second rectification device and the third rectification device, and the switching devices are connected in parallel to the first rectification device and the second rectification device, respectively, thereby allowing step-up operation of stepping up the voltage between the low voltage terminals to the voltage between the high voltage terminals.

4. The DC/DC power conversion apparatus according to claim 1, wherein the device series unit includes first to fourth rectification devices connected in series to each other in order from low potential side to high potential side, the low voltage terminals are connected in parallel to a series unit including the first rectification device and the second rectification device, via the reactor, the capacitor is connected in parallel to a series unit including the second rectification device and the third rectification device, and the switching devices are connected in parallel to the third rectification device and the fourth rectification device, respectively, thereby allowing step-down operation of stepping down the voltage between the high voltage terminals to the voltage between the low voltage terminals.

5. The DC/DC power conversion apparatus according to claim 1, wherein the device series unit includes first to fourth rectification devices connected in series to each other in order from low potential side to high potential side, the low voltage terminals are connected in parallel to a series unit including the second rectification device and the third rectification device, via the reactor, the capacitors are connected in parallel to a series unit including the first rectification device and the second rectification device, and a series unit including the third rectification device and the fourth rectification device, respectively, and the switching devices are connected in parallel to the first to fourth rectification devices, respectively, thereby allowing both step-up operation of stepping up the voltage between the low voltage terminals to the voltage between the high voltage terminals, and step-down operation of stepping down the voltage between the high voltage terminals to the voltage between the low voltage terminals.

6. The DC/DC power conversion apparatus according to claim 1, wherein the device series unit includes first to fourth rectification devices connected in series to each other in order from low potential side to high potential side, the low voltage terminals are connected in parallel to a series unit including the second rectification device and the third rectification device, via the reactor, the capacitors are connected in parallel to a series unit including the first rectification device and the second rectification device, and a series unit including the third rectification device and the fourth rectification device, respectively, and the switching devices are connected in parallel to the second rectification device and the third rectification device, respectively, thereby allowing step-up operation of stepping up the voltage between the low voltage terminals to the voltage between the high voltage terminals.

7. The DC/DC power conversion apparatus according to claim 1, wherein the device series unit includes first to fourth rectification devices connected in series to each other in order from low potential side to high potential side, the low voltage terminals are connected in parallel to a series unit including the second rectification device and the third rectification device, via the reactor, the capacitors are connected in parallel to a series unit including the first rectification device and the second rectification device, and a series unit including the third rectification device and the fourth rectification device, respectively, and the switching devices are connected in parallel to the first rectification device and the fourth rectification device, respectively, thereby allowing step-down operation of stepping down the voltage between the high voltage terminals to the voltage between the low voltage terminals.

8. The DC/DC power conversion apparatus according to claim 1, wherein a DC power supply is connected between the low voltage terminals, a DC load is connected between the high voltage terminals, and the control circuit controls ON/OFF operation of the switching devices such that the operation to store energy by the reactor is performed through conduction to the reactor, the reactor being connected, via the capacitor, between the low voltage terminals, thereby controlling the DC voltage conversion for the step-up operation for the voltage ratio k in a range $1 \leq k < 2$.

9. The DC/DC power conversion apparatus according to claim 1, wherein a DC power supply is connected between the low voltage terminals, a DC load is connected between the high voltage terminals, and the control circuit controls ON/OFF operation of the switching devices such that the operation to store energy by the reactor is performed through conduction to the reactor, the reactor being connected, not via the capacitor, between the low voltage terminals, thereby controlling the DC voltage conversion for the step-up operation for the voltage ratio k in a range $k > 2$.

10. The DC/DC power conversion apparatus according to claim 1, wherein a DC power supply is connected between the high voltage terminals, a DC load is connected between the low voltage terminals, and the control circuit controls ON/OFF operation of the switching devices such that the operation to store energy by the reactor is performed through conduction to the reactor, the reactor being connected, not via the capacitor, between the high voltage terminals, thereby controlling the DC voltage conversion for the step-down operation for the voltage ratio k in a range $1 \leq k < 2$.

11. The DC/DC power conversion apparatus according to claim 1, wherein a DC power supply is connected between the high voltage terminals, a DC load is connected between the low voltage terminals, and the control circuit controls ON/OFF operation of the switching devices such that the operation to store energy by the reactor is performed through conduction to the reactor, the reactor being connected, via the capacitor, between the high voltage terminals, thereby controlling the DC voltage conversion for the step-down operation for the voltage ratio k in a range k>2.

12. The DC/DC power conversion apparatus according to claim 8, wherein
the control circuit changes the switching frequency in accordance with the voltage ratio k, based on the following expression, $$f=(V1/(2{\times}L{\times}\Delta I)){\times}(k-1){\times}(2-k)/k$$

where V1 represents the voltage between the low voltage terminals, f represents the switching frequency, L represents an inductance of the reactor, and ΔI represents the predetermined limiting value of the current ripple flowing in the reactor.

13. The DC/DC power conversion apparatus according to claim 10, wherein
the control circuit changes the switching frequency in accordance with the voltage ratio k, based on the following expression, $$f=(V1/(2{\times}L{\times}\Delta I)){\times}(k-1){\times}(2-k)/k$$

where V1 represents the voltage between the low voltage terminals, f represents the switching frequency, L represents an inductance of the reactor, and ΔI represents the predetermined limiting value of the current ripple flowing in the reactor.

14. The DC/DC power conversion apparatus according to claim 9, wherein
the control circuit changes the switching frequency in accordance with the voltage ratio k, based on the following expression, $$f=(V1/(2{\times}L{\times}\Delta I)){\times}(k-2)/k$$

where V1 represents the voltage between the low voltage terminals, f represents the switching frequency, L represents an inductance of the reactor, and ΔI represents the predetermined limiting value of the current ripple flowing in the reactor.

15. The DC/DC power conversion apparatus according to claim 11, wherein
the control circuit changes the switching frequency in accordance with the voltage ratio k, based on the following expression, $$f=(V1/(2{\times}L{\times}\Delta I)){\times}(k-2)/k$$

where VI represents the voltage between the low voltage terminals, f represents the switching frequency, L represents an inductance of the reactor, and ΔI represents the predetermined limiting value of the current ripple flowing in the reactor.

* * * * *

UNITED STATES PATENT AND TRADEMARK OFFICE
CERTIFICATE OF CORRECTION

PATENT NO. : 8,773,082 B2  
APPLICATION NO. : 13/382231  
DATED : July 8, 2014  
INVENTOR(S) : Takahiro Urakabe et al.

Page 1 of 1

It is certified that error appears in the above-identified patent and that said Letters Patent is hereby corrected as shown below:

In the Claims,

Column 21, Claim 12, line 8:

Change "$f=(V1/(2\times L\times \Delta I)\times(k-1)\times(2-k)/k$" to --$f=(V1/(2\times L\times \Delta I))\times(k-1)\times(2-k)/k$--.

Signed and Sealed this  
Second Day of December, 2014

Michelle K. Lee  
*Deputy Director of the United States Patent and Trademark Office*